United States Patent
Hasegawa

(10) Patent No.: US 7,243,021 B2
(45) Date of Patent: Jul. 10, 2007

(54) FAILURE DIAGNOSTIC METHOD AND APPARATUS FOR MANIFOLD PRESSURE SENSOR

(75) Inventor: Shumpei Hasegawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/354,077

(22) Filed: Feb. 15, 2006

(65) Prior Publication Data

US 2006/0184310 A1    Aug. 17, 2006

(30) Foreign Application Priority Data

Feb. 16, 2005    (JP) .............................. 2005-039071

(51) Int. Cl.
*F02D 45/00*    (2006.01)
*G01F 17/00*    (2006.01)

(52) U.S. Cl. ..................................... 701/114

(58) Field of Classification Search ................ 701/114, 701/110, 112, 102; 73/117.3, 118.1, 118.2; 123/399, 361
See application file for complete search history.

(56) References Cited

U.S. PATENT DOCUMENTS 5,808,189 A * 9/1998 Toyoda ...................... 73/118.2
7,100,571 B1 * 9/2006 Hasegawa ................... 123/399
2006/0184309 A1 * 8/2006 Hasegawa ................... 701/114

FOREIGN PATENT DOCUMENTS

JP    10-176582 A    6/1998
JP    2003-307152 A    10/2003

* cited by examiner

*Primary Examiner*—Hieu T. Vo
(74) *Attorney, Agent, or Firm*—Birch, Stewart, Kolasch & Birch, LLP

(57) ABSTRACT

To identify a failed manifold pressure sensor in a control apparatus having two manifold pressure detection systems as a. A calculating unit calculates a difference between the manifold pressure detected by two sensors. A first comparing unit outputs an abnormal signal when the difference is larger than a threshold value. A calculating unit calculates a difference between the manifold pressure and the atmospheric pressure. A difference calculating unit calculates a difference between the manifold pressure and the atmospheric pressure. When the abnormal signal is outputted from the first comparing unit while an engine is stopped, a second comparing unit compares the differences in response thereto. Depending on which one of the differences is larger, it is determined which one of the manifold pressure sensors is abnormal.

14 Claims, 4 Drawing Sheets

FAILURE DIAGNOSTIC METHOD AND APPARATUS FOR MANIFOLD PRESSURE SENSOR

CROSS-REFERENCE TO RELATED APPLICATIONS

This nonprovisional application claims priority under 35 U.S.C. § 119(a) on Patent Application No. 2005-039071, filed in Japan on Feb. 16, 2005, the entirety of which is incorporated herein by reference.

BACKGROUND OF THE INVENTION

1. Field of the Invention

The present invention relates to a failure diagnostic method and apparatus for manifold pressure sensors used in an engine control system. More specifically, the present invention relates to a failure diagnostic method and apparatus for manifold pressure sensors in a system having a first manifold pressure sensor and a second manifold pressure sensor that backs up the first manifold pressure sensor.

2. Description of Background Art

Hitherto, a number of sensors have been used in an engine control system and a failure diagnostic system for diagnosing whether or not these sensors are normal is known. For example, JP-A-2003-307152 discloses a method including a step of determining whether or not an output signal of a sensor that senses pressure in an intake manifold is within a preset range, a step of calculating the pressure in the intake manifold on the basis of engine operating conditions, and a step of determining whether or not the difference between the pressure in the intake manifold indicated by the output signal from the sensor and the calculated pressure in the intake manifold is smaller than a set value when the output signal from the sensor is within the range, wherein when the output signal from the sensor is not within the range or when the difference is not smaller than the set value, the calculated pressure is set as the pressure in the intake manifold.

In an electronically controlled throttle apparatus disclosed in JP-A-10-176582, two systems each including an accelerator sensor, a throttle sensor, and so on are provided as a failsafe or the like. The failure diagnosis is performed by comparing sensor outputs of the two systems. For example, by comparing a deviation between a main throttle sensor and a sub throttle sensor and a predetermined threshold value, it can be determined whether or not the throttle sensor has failed.

Failures such as a disconnection and a short circuit of a sensor system can be determined to be abnormal when a sensor output value is too high or too low with respect to a predetermined value or a predetermined range. These types of failures can be addressed in a manner that is determined in advance. However, in some situations, a change or deterioration of output characteristics, which may impair normal control even though the sensor output value is within the predetermined range, cannot be determined to be abnormal. For example, in engine controls for airplanes, a further strict standard is provided for the accuracy of failure diagnosis. Therefore, the failure diagnostic method in the background art is not sufficient.

On the other hand, the diagnostic method disclosed in JP-A-10-176582 can detect that either one of the two systems has failed. However, it is difficult to determine which one of the two systems has failed.

SUMMARY OF THE INVENTION

It is an object of the invention to provide a failure diagnostic method and apparatus for manifold pressure sensors, which can reliably detect which manifold pressure sensor has a failure, in a system having two systems of manifold pressure sensors.

In order to achieve the above-described object, an embodiment of the present invention is directed to a failure diagnostic method for manifold pressure sensors used in an engine control system having a first manifold pressure sensor that performs main control, a second manifold pressure sensor that backs up the first manifold pressure sensor, and an atmospheric pressure sensor. The method includes the steps of determining to be abnormal when the difference between a pressure value detected by the first manifold pressure sensor and a pressure value detected by the second manifold pressure sensor exceeds a predetermined value, and identifying one of the first manifold pressure sensor and second manifold pressure sensor as a failed sensor, if a value is larger in difference from that of the atmospheric pressure sensor, wherein the step of identifying the failed sensor is performed when it is determined to be abnormal while an engine is stopped.

An embodiment of the present invention is also directed to a failure diagnostic apparatus for manifold pressure sensors used in an engine control system having a first manifold pressure sensor that performs main control, a second manifold pressure sensor that backs up the first manifold pressure sensor, and an atmospheric pressure sensor. The apparatus includes an abnormality recognizing unit that outputs an abnormal signal when the difference between a first detected manifold pressure value detected by the first manifold pressure sensor and a second detected manifold pressure value detected by the second manifold pressure sensor exceeds a threshold value, and an abnormality identifying unit that calculates the differences of the first detected manifold pressure value and the second detected manifold pressure value with respect to the pressure value detected by the atmospheric pressure sensor, respectively, and identifies as a failed sensor the manifold pressure sensor that detects the manifold pressure value having a calculated difference that is larger, wherein identification of the failed sensor by the abnormality identifying unit is performed in response to an output of the abnormal signal while the engine is stopped.

According to a further aspect of the present invention, the determination of differences by the abnormality recognizing unit and the abnormality identifying unit are performed using absolute values of the differences.

According to a further aspect of the present invention, the abnormality recognizing unit outputs an abnormal signal when a ratio value between the first detected manifold pressure value detected by the first manifold pressure sensor and the second detected manifold pressure value detected by the second manifold pressure sensor is deviated from a predetermined range. In addition, the abnormality identifying unit calculates a ratio value between the pressure value detected by the atmospheric pressure sensor and the first detected manifold pressure value and a ratio value between the pressure value detected by the atmospheric pressure sensor and the second detected manifold pressure value and identifies as a failed sensor the manifold pressure sensor that detects the manifold pressure value having a calculated ratio value that is deviated more from the predetermined value, wherein the identification of the failed sensor by the abnormality identifying unit is performed in response to the output of the abnormal signal while the engine is stopped.

According to the present invention, if at least one of the first and second manifold pressure sensors has failed it is recognized when the difference between the outputs of the first and second manifold pressure sensors is large. When the abnormality is determined, the differences between the pressures detected by the first and second manifold pressure sensors and the pressure detected by the atmospheric pressure sensor is calculated when the engine is stopped, and the manifold pressure sensor which has detected the pressure having a calculated difference that is larger (for example, the one having a ratio value that is deviated more from the predetermined value) can be determined to be abnormal.

Therefore, abnormalities can be detected, which cannot be detected by the failure detection means in the background art which determines abnormality of the sensor only from the fact that the output of the sensor simply departs from the predetermined range, for example, the sensor whose function is lowered by deterioration.

Accordingly, for example, in the engine control system having two manifold pressure detection systems as a failsafe in which when one of the detection systems has failed, the other detection system backs it up, it can be determined whether both of the manifold pressure detection systems are normal or have either one of them has failed when the engine is started and, based on this determination, a compensating operation required to the control system is enabled. The compensating operation includes usage of a substitute value or switching to a backup system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
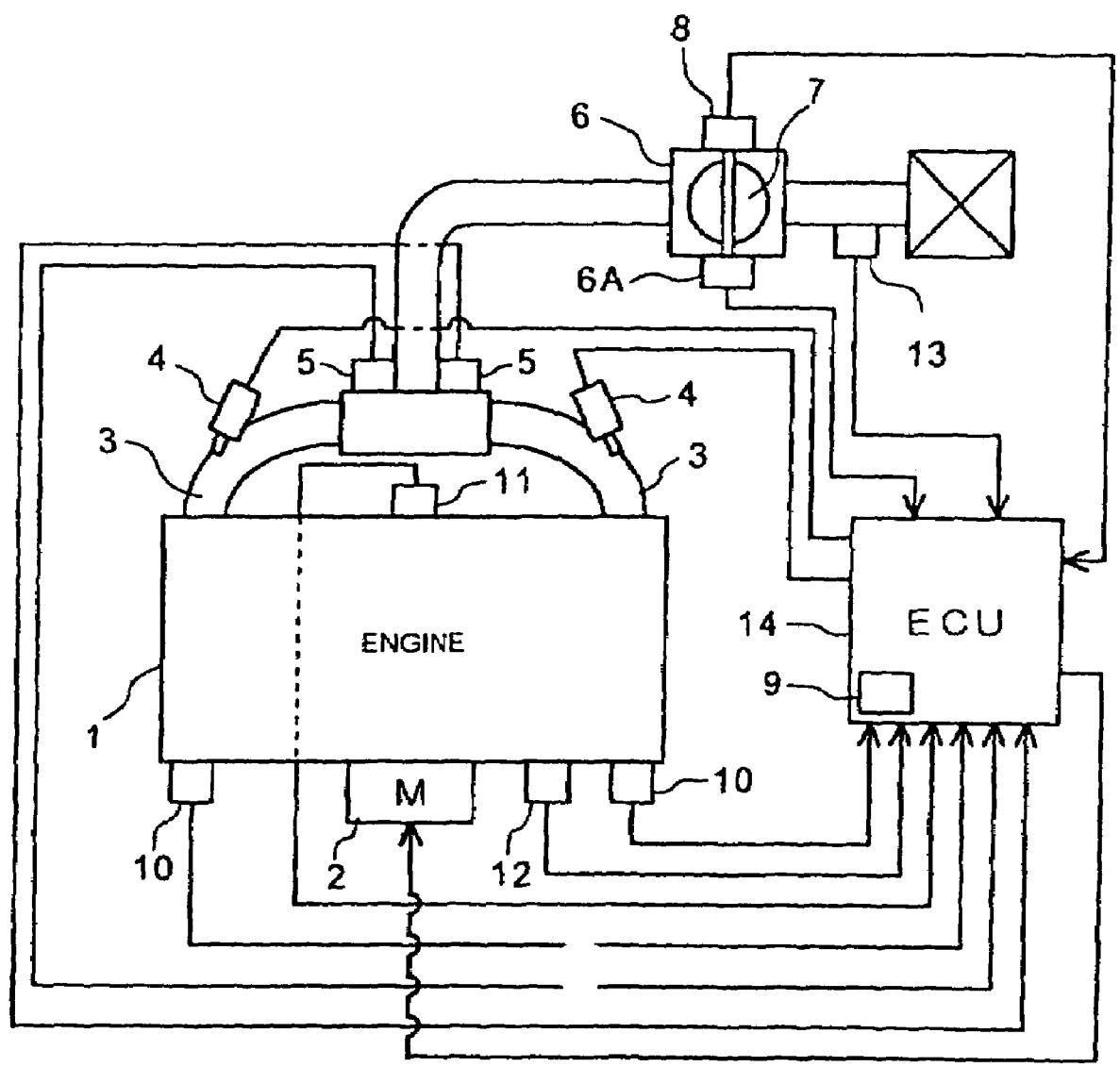
FIG. 2 is a general drawing showing an engine control system including the diagnostic apparatus according to the embodiment of the present invention.

Referring now to the drawings, an embodiment of the invention will be described. FIG. 2 is a block diagram of a principal portion of an engine including a failure diagnostic apparatus. In FIG. 2, an engine 1 is a reciprocal internal combustion engine for an airplane, and is provided with a starter motor 2 for activation. Although components for two cylinders are shown in FIG. 2, the number of cylinders in the engine 1 is not limited. An intake manifold 3 of the engine 1 is provided with fuel injection valves 4, and manifold pressure sensors 5 on the upstream side of the fuel injection valve 4 for detecting a pressure in the intake manifold 3. Two each of the manifold pressure sensors 5 are provided on all the cylinders for main control and for back-up. In order to differentiate these two manifold pressure sensors, the one for the main control will be referred to as a first manifold pressure sensor 5A and the one for the back-up will be referred to as a second manifold pressure sensor 5B.

A throttle body 6 is provided on the upstream side of the manifold pressure sensor 5, and a throttle valve 7 is assembled in the throttle body 6. The throttle valve 7 is driven by a motor 8. The throttle body 6 is provided with a throttle sensor 6A for detecting a throttle opening. Known sensors required for controlling the engine such as an atmospheric pressure senor 9, a cam pulser 10, a crank pulser 11, a cooling water temperature sensor 12, and an air temperature sensor 13, and so on are further provided for controlling the engine 1.

An electronic control unit (ECU) 14 for performing fuel injection or ignition control according to a program upon reception of output signals from the respective sensors described above. The ECU 14 includes a failure diagnostic function for manifold pressure sensors 5.

Figure 3:
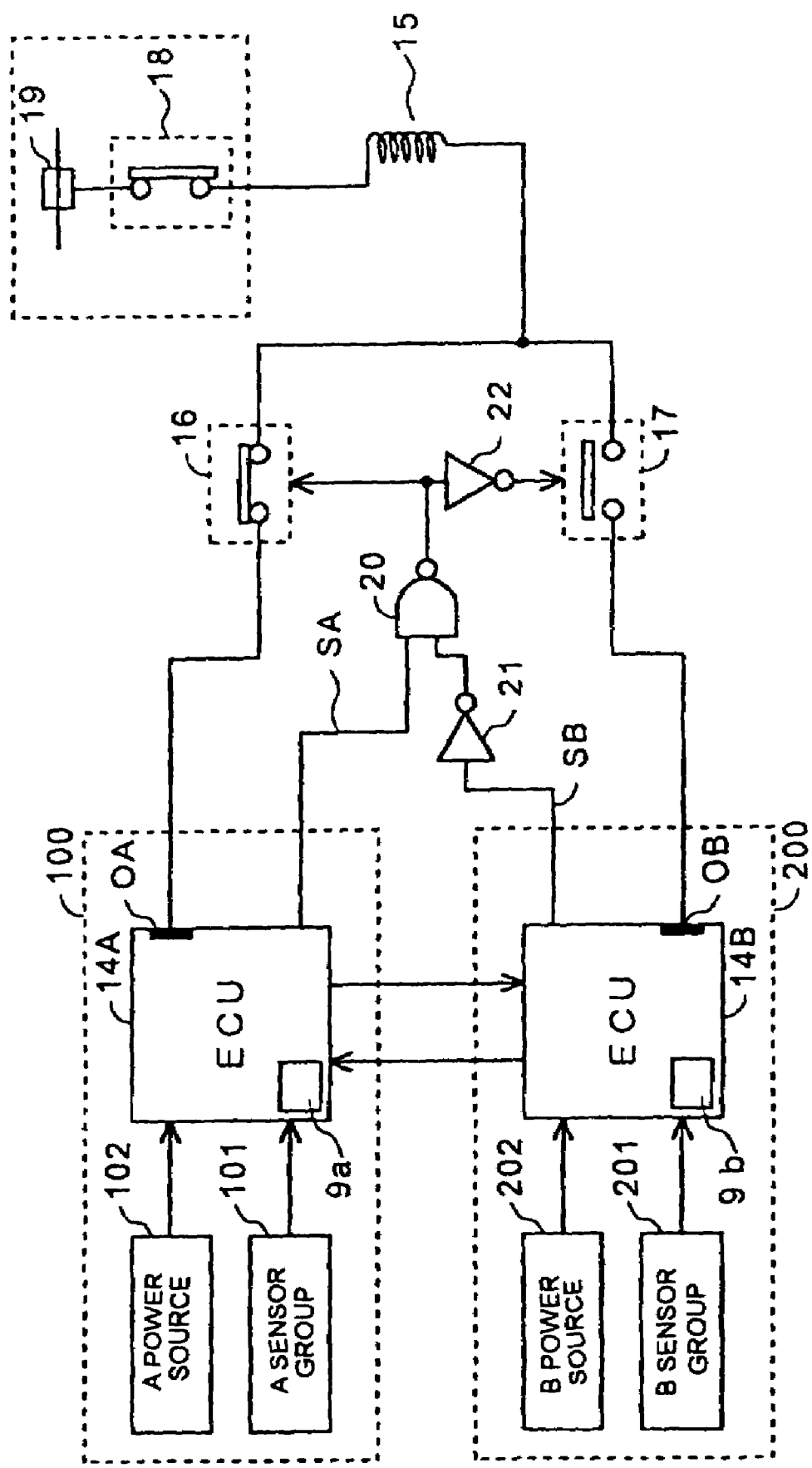
FIG. 3 is a block diagram showing a principal portion of the engine control system including the diagnostic apparatus according to the embodiment of the present invention.

FIG. 3 is a block diagram showing a general structure of the engine control system described above. As shown in FIG. 3, the control system of this embodiment is provided with two systems of detection circuits for the sensors and the ECUs 14 as a failsafe. These systems are referred to as the A lane 100 and the B lane 200, respectively. The A lane 100 includes an A sensor group 101 including the sensors described in conjunction with FIG. 2, an A power source 102, and an ECU 14A for the A lane. Likewise, the B lane 200 includes a B sensor group 201, a B power source 202, and an ECU 14B for the B lane. Although the atmospheric pressure sensors 9 (9a and 9b) are provided on circuit boards which constitute the ECU 14A and the ECU 14B or in housings (not shown) of the ECUs 14A and 14B in this embodiment, the positions of installation are not limited thereto.

The ECUs 14A and 14B are capable of communicating with each other in both ways via communication interfaces of one another, not shown. One end (minus side) of each drive coil of the fuel injection valve 4 provided for each cylinder (only one is shown) 15 is connected to injection signal output terminals OA and OB of the ECU 14A and 14B respectively via change-over switches 16, 17. The other end of the drive coil 15 (plus side) is connected to a power source 19, which outputs, for example, a voltage of 14 volts via a power switch 18. The power switch 18 is provided with a current limiting function. The power sources 19 and the power switches 18 are provided in the ECUs 14A and 14B, respectively.

A switching signal 5A outputted from the ECU 14A is connected to an input side of an NAND circuit 20 on one side, and a switching signal 5B outputted from the ECU 14B on an input side of the NAND circuit 20 on the other side via an NOT circuit 21. The output from the NAND circuit 20 is supplied to the change-over switch 16 and also to the change-over switch 17 via another NOT circuit 22.

Power is distributed from the power source 19 to the drive coil 15 depending on the condition of the injection signal output terminal of the lane which is connected to one of the change-over switches 16, 17 selected by the switching signals SA and SB. The valve-open duration of the fuel injection valve 4, that is, the amount of fuel injection is determined by the duration of this power distribution.

Figure 4:
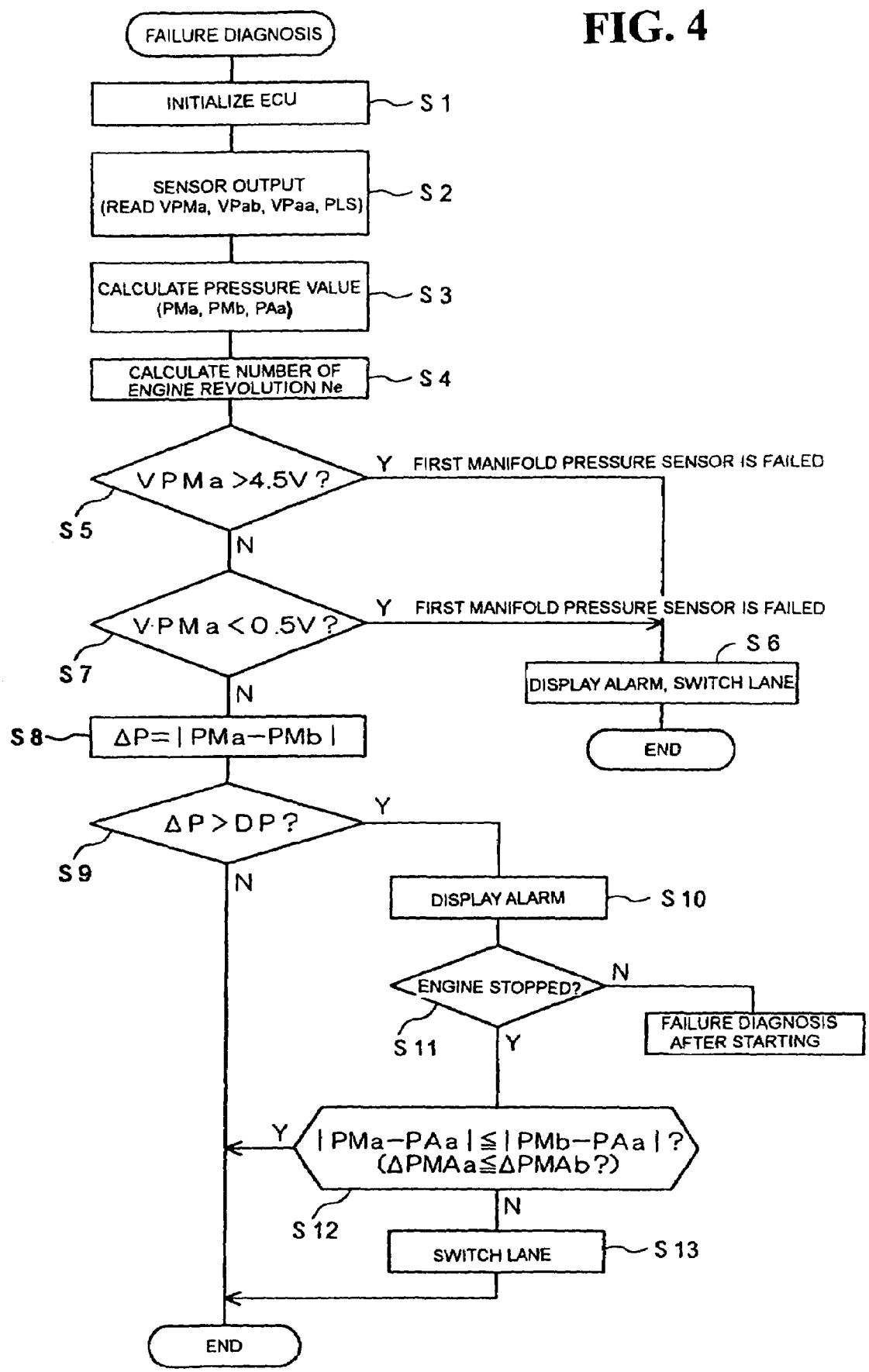
FIG. 4 is a flowchart showing a process of the principal portion of the diagnostic apparatus according to the embodiment of the present invention.

Subsequently, the failure diagnostic function of the manifold pressure sensors 5A and 5B when the engine is started will be described. In this embodiment, the A lane 100 is for a main control and the B lane 200 serves as a back-up. FIG. 4 is a flowchart of a failure diagnostic processing of the manifold pressure sensors 5A and 5B. The process shown in FIG. 4 is activated when a starting switch of the engine 1 is switched from OFF to ON. In Step S1, the ECUs 14A and 14B are initialized. In Step S2, an output voltage VPMa of the manifold pressure sensor (the first manifold pressure sensor) 5A of the A lane 100, an output voltage VPMb of the manifold pressure sensor (the second manifold pressure sensor) 5B of the B lane 200, an output voltage VPaa of the atmospheric pressure sensor 9a of the A lane 100, and a crank pulse PLS outputted from the crank pulser 11 of the A lane 100 are read.

In Step S3, physical values PMa, PMb, and PAa (unit: mmHg) of the pressure are calculated on the basis of the output voltages VPMa, VPMb, and VPaa. For example, the output voltages are converted to the physical values using a prepared conversion table. In Step S4, an engine revolution Ne (rpm) is calculated on the basis of the crank pulse PLS. The engine revolution Ne can be calculated by the intervals of the crank pulses PLS. When no crank pulse PLS is detected, the engine 1 is not rotated.

In Step S5, whether or not the voltage VPMa exceeds a predetermined upper limit value (4.5 volts in this case) is determined. If the result of the determination is affirmative, it is determined that the manifold pressure sensor 5A is failed due to a short circuit or the like. Therefore, the procedure goes to Step S6, where an alarm display or a process of switching the lane from the A lane 100 to the B lane 200 is performed as a process against abnormality. When the result of Step S5 is negative, the procedure goes to Step S7.

In Step S7, whether or not the voltage VPMa is smaller than a predetermined lower limit value (0.5 volts for example) is determined. When the result of this determination is affirmative, it is determined that the manifold pressure sensor 5A has failed due to a disconnection or the like. Therefore, the procedure goes to Step S6 and the process against abnormality is performed.

When the determination in Step S7 is negative, it is determined that there is no failure such as a short circuit or a disconnection in the first manifold pressure sensor 5A. However, there is a case in which the output voltage VPMa falls within the range defined by the upper limit value and the lower limit value even though a functional abnormality occurred in the first manifold pressure sensor 5A due to deterioration or the like and hence the first manifold pressure sensor 5A does not output the normal pressure value. Therefore, the functional abnormality due to deterioration cannot be determined by the processes in Steps S5 and S7.

Therefore, whether or not there is any deterioration in the first manifold pressure sensor 5A is determined by the following process. In Step S8, a difference ΔP between the manifold pressures PMa and PMb is calculated. The difference ΔP is obtained as an absolute value. In Step S9, whether or not the difference ΔP is larger than a threshold value DP is determined. The threshold value DP is 44.8 mmHg for example. Since it seems unlikely that the first manifold pressure sensor 5A and the second manifold pressure sensor 5B are deteriorated by the same extent at the same time, when the difference ΔP is smaller than the threshold value DP, it is determined that the first manifold pressure sensor 5A and the second manifold pressure sensor 5B are determined to be operated normally, and hence the normal control loop is continued.

When the difference ΔP is larger than the threshold value DP, it is determined that either one of the first manifold pressure sensor 5A or the second manifold pressure sensor 5B is functionally abnormal, the procedure goes to Step S10, where the alarm display for notifying the abnormality is executed.

Then, in the following steps, which one of the manifold pressure sensors 5A and 5B is failed is specified. In Step S11, whether or not the engine 1 is in a stopped state is determined. This can be determined by whether or not the engine revolution Ne is zero, that is, whether the crank pulse PLS exists.

In the state in which the engine 1 is stopped, the atmospheric pressure and the pressure in the manifold must be equivalent. Therefore, by diagnosing on condition that the engine is stopped, it is possible to determine the sensor out of the first manifold pressure sensor 5A and the second manifold pressure sensor 5B whose pressure value is deviated more from the pressure PAa detected by the atmospheric pressure sensor 9a as a failed sensor.

When it is determined that the engine 1 is stopped, the procedure goes to Step S12. In Step S12, an absolute value ΔPMAa of the difference between the detected pressure value PMa detected by the first manifold pressure sensor 5A and the detected pressure value PAa by the atmospheric pressure sensor 9a and an absolute value ΔPMAb of the difference between the detected pressure value PMb detected by the second manifold pressure sensor 5B and the detected pressure value PAa by the atmospheric pressure sensor 9a are compared.

When the result of the determination in Step S12 is negative, it is determined that abnormality such as deterioration is occurred in the first manifold pressure sensor 5A. Therefore, the procedure goes to Step S13 to switch the lane, and the output of the B lane 200 is employed for controlling the engine.

When the determination in Step S12 is affirmative, it is determined that abnormality such as deterioration is occurred in the manifold pressure sensor 5B. In this case, since the abnormality is not occurred in the normal control lane, that is, the A lane 100 which is a main body of control, control by the A lane 100 as the normal control lane is continued.

When it is determined that the engine is not stopped in Step S11, the failure diagnosis cannot be achieved in the process of Step S12, and hence the procedure goes to a failure diagnosis routine after starting the engine. Since the failure diagnostic routine after having started the engine is not a principal portion of the invention, detailed description thereof will be omitted.

Figure 1:
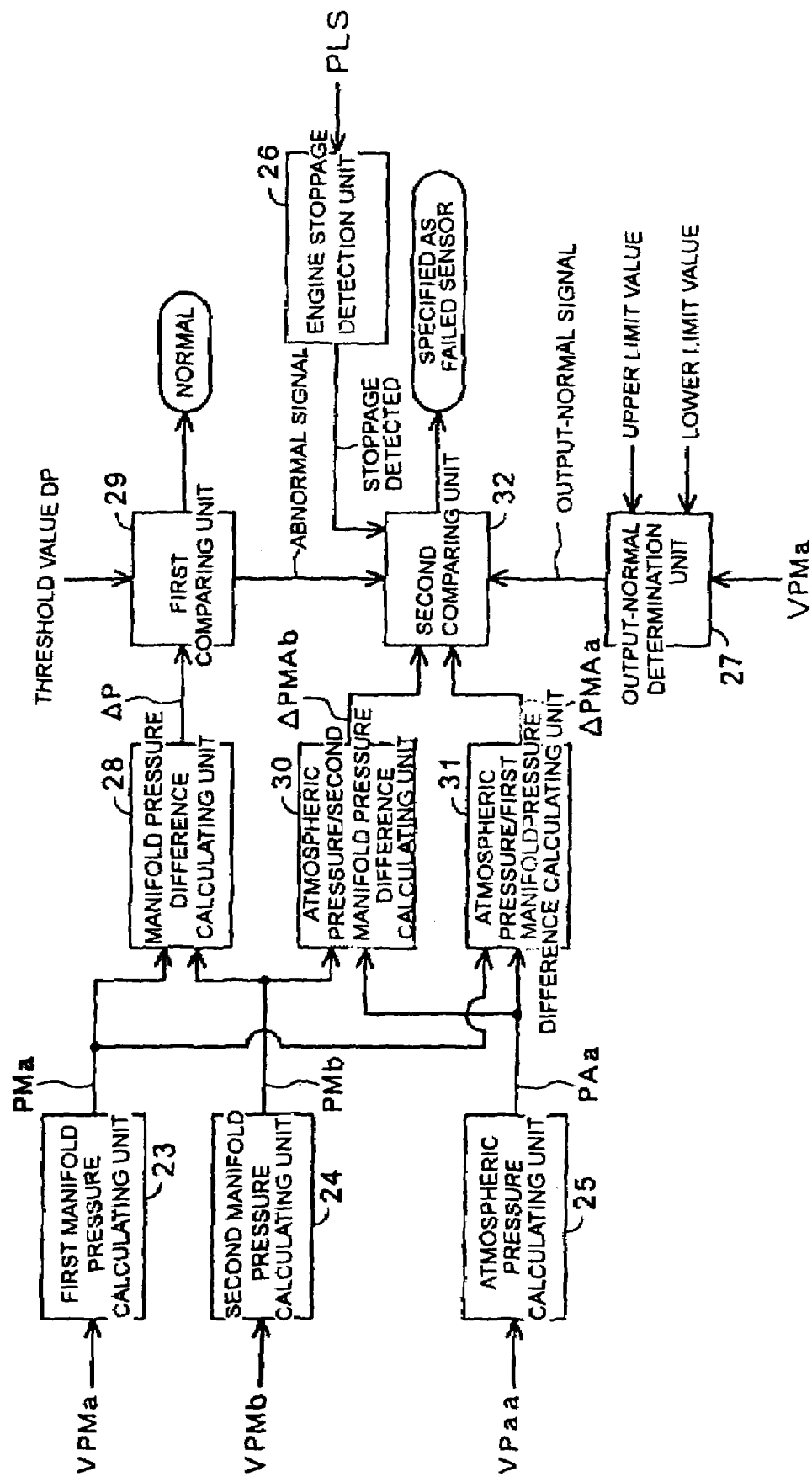
FIG. 1 is a block diagram showing a function of a principal portion of a diagnostic apparatus according to an embodiment of the present invention.

FIG. 1 is a block diagram showing a function of the principal portion of the ECU 14A, which performs the processing described in conjunction with the flowchart in FIG. 4. A first manifold pressure calculating unit 23 calculates the manifold pressure PMa on the basis of values VPMa detected by the manifold pressure sensor 5A. A second manifold pressure calculating unit 24 calculates the manifold pressure PMb on the basis of values VPMb detected by the manifold pressure sensor 5B. An atmospheric pressure calculating unit 25 calculates the atmospheric pressure PAa on the basis of values VPaa detected by the atmospheric pressure sensor 9a. An engine stoppage detection unit 26 outputs a stoppage detection signal when the engine 1 is stopped by the existence of the crank pulse PLS. An output-normal determination unit 27 determines whether or not the detected value VPMa detected by the manifold pressure sensor 5A exists within the predetermined value, that is, between the upper limit value and the lower limit value, and when the detected value VPMa is within the predetermined range, outputs an output-normal signal.

A manifold pressure difference calculating unit 28 calculates the difference ΔP between the manifold pressure PMa and the manifold pressure PMb. A first comparing unit 29 compares the difference ΔP and the threshold value DP. When the difference ΔP is smaller, a normal signal is outputted, and when it is larger, an abnormal signal is outputted. The manifold pressure difference calculating unit 28 and the first comparing unit 29 constitute the abnormality recognizing unit.

An atmospheric pressure/second manifold pressure difference calculating unit 30 calculates the difference ΔPMAb between the manifold pressure PMb and the atmospheric pressure PAa. An atmospheric pressure/first manifold pressure difference calculating unit 31 calculates the difference ΔPMAa between the manifold pressure PMa and the atmospheric pressure PAa. A second comparing unit 32 compares the difference ΔPMAa and the difference PMAb in response to input of all the abnormal signal from the first comparing unit 29, the stoppage detection signal from the engine stoppage detection unit 26, and the output-normal signal from the output-normal determination unit 27. Depending on which one of the difference ΔPMAa and the difference ΔPMAb is larger, if the difference ΔPMAa is larger, it is determined that the manifold pressure sensor 5A is abnormal, and if the difference ΔPMAb is larger, it is determined that the manifold pressure sensor 5B is abnormal. The atmospheric pressure/second manifold pressure difference calculating unit 30, the atmospheric pressure/first manifold pressure difference calculating unit 31 and the second comparing unit 32 constitute abnormality identifying unit.

As described above, according to this embodiment, in a system including manifold pressure sensors provided in a plurality of systems, in order to identify the manifold pressure sensor whose function is lowered due to deterioration or the like, the failed manifold pressure sensor can be specified on the basis of the difference between the pressures detected by the manifold pressure sensor and the atmospheric pressure sensor respectively.

In the embodiment described above, determination of abnormality and identification of the failed sensor are performed on the basis of the differences between the pressure values detected by the first manifold pressure sensor 5A and the second manifold pressure sensor 5B, and between the pressure values detected by the first manifold pressure sensor 5A and the second manifold pressure sensor 5B and the pressure detected by the atmospheric pressure sensor 9a.

However, the invention is not limited thereto. Instead of the difference between the respective pressure values, determination of abnormality or identification of the failed sensor can be performed on the basis of the ratio value. For example, the manifold pressure difference calculating unit 28 may be replaced by a unit that calculates the ratio value between the pressures PMa and PMb. Then, the first comparing unit 29 is adapted to determine whether both of the first manifold pressure sensor 5A and the second manifold pressure sensor 5B are normal, or at least one of them is failed depending on whether the calculated ratio value is within the predetermined range from a predetermined value, that is, "1". For example, when the pressure PMa/PMb is within the range from 0.95 to 1.05, it is determined that both of the first manifold pressure sensor 5A and the second manifold pressure sensor 5B are normal, and when it is out of the range, it is determined that at least one of the first manifold pressure sensor 5A and the second manifold pressure sensor 5B is abnormal.

In the same manner, the atmospheric pressure/second manifold pressure difference calculating unit 30 is replaced by a unit that calculates the ratio value between the pressures PMa and PAa, and the atmospheric pressure/first manifold pressure difference calculating unit 31 is replaced by a unit that calculates the ratio value between the pressures PMb and PAa. Then, the second comparing unit 32 is adapted to identify that the manifold pressure sensor corresponding to the pressure value which corresponds to the sensor whose calculated ratio value is deviated more from the predetermined value, that is, "1" is the failed sensor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A failure diagnostic apparatus for manifold pressure sensors used in an engine control system having a first manifold pressure sensor that performs main control, a second manifold pressure sensor that backs up the first manifold pressure sensor, and an atmospheric pressure sensor, comprising:

an engine stoppage detection unit that detects a fact that an engine is stopped;

an abnormality recognizing unit that outputs an abnormal signal when the difference between a first detected manifold pressure value detected by the first manifold pressure sensor and a second detected manifold pressure value detected by the second manifold pressure sensor exceeds a threshold value; and an abnormality identifying unit that calculates the differences between the first detected manifold pressure value and the second detected manifold pressure value with respect to the pressure value detected by the atmospheric pressure sensor, respectively, and identifies as a failed sensor the manifold pressure sensor that detects the manifold pressure value having a calculated difference that is larger, wherein identification of the failed sensor by the abnormality identifying unit is performed in response to an output of the abnormal signal while the engine is stopped.

2. The failure diagnostic apparatus for manifold pressure sensors according to claim 1, wherein determinations of differences by the abnormality recognizing unit and the abnormality identifying unit are performed using absolute values of the differences.

3. The failure diagnosis apparatus for manifold pressure sensors according to claim 1, wherein the abnormality recognizing unit calculates physical values of the outputs of the first and second manifold pressure sensors from the voltages of the first and second manifold pressure sensors.

4. The failure diagnosis apparatus for manifold pressure sensors according to claim 3, wherein the abnormality recognizing unit determines that a failure has occurred if the voltages of the first or second manifold pressure sensors are above a predetermined upper limit or below a predetermined lower limit.

5. The failure diagnosis apparatus for manifold pressure sensors according to claim 3, wherein the abnormality recognizing unit calculates the physical values of the outputs of the first and second manifold pressure sensors from the output voltages of the first and second manifold pressure sensors by using a conversion table.

6. A failure diagnostic apparatus for manifold pressure sensors used in an engine control system having a first manifold pressure sensor that performs main control, a second manifold pressure sensor that backs up the first manifold pressure sensor, and an atmospheric pressure sensor, comprising:
an engine stoppage detection unit that detects a fact that an engine is stopped;
an abnormality recognizing unit that outputs an abnormal signal when a ratio value between a first detected manifold pressure value detected by the first manifold pressure sensor and a second detected manifold pressure value detected by the second manifold pressure sensor is deviated from a predetermined range; and
an abnormality identifying unit that calculates a ratio value between a pressure value detected by the atmospheric pressure sensor and the first detected manifold pressure value and a ratio value between the pressure value detected by the atmospheric pressure sensor and the second detected manifold pressure value and identifies as a failed sensor the manifold pressure sensor that detects the manifold pressure value having a calculated ratio value that is deviated more from the predetermined value,
wherein the identification of the failed sensor by the abnormality identifying unit is performed in response to the output of the abnormal signal while the engine is stopped.

7. The failure diagnosis apparatus for manifold pressure sensors according to claim 6, wherein the abnormality recognizing unit calculates physical values of the outputs of the first and second manifold pressure sensors from the voltages of the first and second manifold pressure sensors.

8. The failure diagnosis apparatus for manifold pressure sensors according to claim 7, wherein the abnormality recognizing unit determines that a failure has occurred if the voltages of the first end or second manifold pressure sensors are above a predetermined upper limit or below a predetermined lower limit.

9. The failure diagnosis apparatus for manifold pressure sensors according to claim 7, wherein the abnormality recognizing unit calculates the physical values of the outputs of the first and second manifold pressure sensors from the output voltages of the first and second manifold pressure sensors by using a conversion table.

10. A failure diagnostic method for manifold pressure sensors used in an engine control system having a first manifold pressure sensor that performs main control, a second manifold pressure sensor that backs up the first manifold pressure sensor, and an atmospheric pressure sensor, said method comprising the steps of:
determining that a sensor has failed when the difference between a pressure value detected by the first manifold pressure sensor and a pressure value detected by the second manifold pressure sensor exceeds a predetermined value; and
identifying one of the first and second manifold pressure sensors as a failed sensor by determining which of the first and second manifold pressure sensors has an output value that is larger in difference from that of the atmospheric pressure sensor,
wherein the step of identifying the failed sensor is performed when it is determined to be abnormal while an engine is stopped.

11. The failure diagnosis method for manifold pressure sensors according to claim 10, wherein the step of determining that a failure has occurred further comprises the step of using the absolute value of the differences.

12. The failure diagnosis method for manifold pressure sensors according to claim 10, further comprising the step of calculating the physical values of the outputs of the first and second manifold pressure sensors from the voltages of the first and second manifold pressure sensors.

13. The failure diagnosis method for manifold pressure sensors according to claim 12, further comprising the step of determining that a failure has occurred if the voltages of the first or second manifold pressure sensors are above a predetermined upper limit or below a predetermined lower limit.

14. The failure diagnosis method for manifold pressure sensors according to claim 12, wherein the step of calculating the physical values of the outputs of the first and second manifold pressure sensors from the output voltages of the first and second manifold pressure sensors further comprises the step of using a conversion table.

* * * * *